United States Patent
Colrain et al.

(10) Patent No.: US 10,942,907 B2
(45) Date of Patent: Mar. 9, 2021

(54) SAFE RELEASE OF DATABASE SESSIONS FOR PLANNED MAINTENANCE OPERATIONS

(71) Applicant: Oracle International Corporation, Redwood Shores, CA (US)

(72) Inventors: Carol L. Colrain, Redwood Shores, CA (US); Kevin S. Neel, San Mateo, CA (US); Douglas N. Surber, Orinda, CA (US); Tong Zhou, Merrick, NY (US); Nancy R. Ikeda, Los Altos Hills, CA (US); Jean De Lavarene, Versailles (FR); Rohan Ankalikar, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 471 days.

(21) Appl. No.: 15/803,644

(22) Filed: Nov. 3, 2017

(65) Prior Publication Data
US 2018/0129688 A1    May 10, 2018

Related U.S. Application Data

(60) Provisional application No. 62/417,874, filed on Nov. 4, 2016.

(51) Int. Cl.
*G06F 16/27* (2019.01)
*G06F 16/21* (2019.01)
*H04L 29/08* (2006.01)

(52) U.S. Cl.
CPC ............ *G06F 16/217* (2019.01); *G06F 16/21* (2019.01); *G06F 16/27* (2019.01); *H04L 67/1097* (2013.01)

(58) Field of Classification Search
CPC .... G06F 16/27; G06F 16/1844; G06F 16/237; G06F 11/1662; G06F 2201/82
(Continued)

(56) References Cited

U.S. PATENT DOCUMENTS 5,907,848 A   5/1999 Zaiken
5,913,029 A   6/1999 Shostak
(Continued)

OTHER PUBLICATIONS

Liu et al., "ad-heap: an Efficient Heap Data Structure for Asymmetric Multicore Processors", In Proceedings of Workshop on General Purpose Processing Using GPUs, ACM, dated 2014, 10 pages.
(Continued)

*Primary Examiner* — Robert W Beausoliel, Jr.
*Assistant Examiner* — Pedro J Santos
(74) *Attorney, Agent, or Firm* — Hickman Becker Bingham Ledesma LLP

(57) ABSTRACT

Techniques are described for closing one or more connections with a database management system (DBMS) as part of a planned operation such as maintenance and load balancing. In an embodiment, a request is received for a planned operation of a database server of a DBMS that requires releasing and migrating database sessions. Over a database connection with the database server, the DBMS or a Client-Driver on the client system that interfaces with the DBMS, may receive request(s) from the client system. Based on the request(s), a safe point, for the database connection with the database server, at which the database connection of the client system with the database server can be closed without affecting the success of execution of next one or more command that the client system intended to request the DBMS to execute on the database server, is determined. In an embodiment, in response to the request(s), the DBMS and/or Client-Driver, while the connection is
(Continued)

valid, provide to the client system an invalid status for a connection test request. Such a response may cause the client system to use a different database connection to connect with the DBMS. After returning the response to the client system, the DBMS and/or Client-Driver causes the database session with the DBMS to close. In an embodiment, for database sessions to be released, the DBMS identifies a safe point in a database session by a detected request boundary or where the session states are determined to be recoverable or the failover is determined to be expected to succeed. At such a safe point, all database session states are known, and failing the session over to another database instance offering the requested service can be performed safely and transparent to applications.

26 Claims, 5 Drawing Sheets

(58) Field of Classification Search
USPC .... 707/E17.005, 17.044, 636, 652, 659, 704
See application file for complete search history.

(56) References Cited

U.S. PATENT DOCUMENTS

| | | | |
|---|---|---|---|
| 6,868,445 B1* | 3/2005 | Chebrolu | H04L 47/125 379/32.04 |
| 2009/0043778 A1 | 2/2009 | Jambunathan | |
| 2010/0005097 A1 | 1/2010 | Liang | |
| 2010/0036957 A1 | 2/2010 | Patel | |
| 2011/0246419 A1* | 10/2011 | Yancey | G06F 11/14 707/624 |
| 2013/0066952 A1 | 3/2013 | Colrain | |
| 2013/0066955 A1 | 3/2013 | Neel | |
| 2013/0097307 A1 | 4/2013 | Vazac | |
| 2016/0041882 A1 | 2/2016 | Kruse | |
| 2016/0179420 A1 | 6/2016 | Mei | |
| 2017/0212691 A1 | 7/2017 | Katsuki | |
| 2017/0289271 A1 | 10/2017 | Seed | |
| 2017/0339176 A1 | 11/2017 | Backer | |
| 2019/0102267 A1 | 4/2019 | Giloni | |
| 2019/0102401 A1 | 4/2019 | Neel | |

OTHER PUBLICATIONS

LaMarca et al., "The Influence of Caches on the Performance of Heaps", dated Jan. 1, 1996, 26 pages.

Furtak et al., "Using SIMD Registers and Instructions to Enable Instruction-Level Parallelism in Sorting Algorithms", ACM Symposium on Parallel Algorithms and Architectures, dated 2007, 10 pages.

D.E. Knuth, "The Art of Computer Programming", vol. 3: 2nd Edition Sorting and Searching, ISBN: 0-201-03803-X, pp. 129-157 from book, dated 1973.

Neel, U.S. Appl. No. 16/147,314, filed Sep. 28, 2018, Office Action, dated Jul. 28, 2020.

Giloni, U.S. Appl. No. 16/147,367, filed Sep. 28, 2018, Office Action, dated Jul. 9, 2020.

* cited by examiner

SAFE RELEASE OF DATABASE SESSIONS FOR PLANNED MAINTENANCE OPERATIONS

BENEFIT CLAIM

This application claims the benefit under 35 U.S.C. § 119(e) of provisional application 62/417,874, filed Nov. 4, 2016, the entire contents of which is hereby incorporated by reference for all purposes as if fully set forth herein.

FIELD OF THE TECHNOLOGY

The present invention relates to the field of electronic database management.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Applications using a database management system (DBMS) for data processing frequently connect to the DBMS to request the execution of one or more commands. Establishing a session over a new connection with the DBMS for each execution request incurs a substantial overhead. To alleviate the frequent resource intensive connection establishment between an application and a DBMS, the application may utilize a connection pool manager (CPM). Rather than closing the connections for which an application has already spent resources to establish, the application "returns" the still open connection to a CPM for a later re-use. Such a "caching" of connections are useful because when the application wants to send to the DBMS another set of commands, rather than spending resources on opening a new connection for a session with the DBMS, the application requests the CPM to provide the application with a connection with the DBMS. The CPM, rather than opening a new connection with the DBMS, may provide the application with an available existing idle (not already borrowed), connection for the application to use. Doing so, the CPM provides the application with a connection for establishing a session to use for the commands without the overhead of establishing new connections.

Although such caching of open connections optimizes resources for applications connecting with a DBMS, as in the example of a CPM, the caching significantly complicates planned maintenance(s) of the DBMS. Similar complications occur even for applications that rather than using a CPM, simply keep their connection always open.

In order to gracefully shut down a database server (or a critical service thereof) for a planned maintenance, the DBMS has to ensure that all the sessions and thus, the connections used by the sessions with the database server can be safely disconnected. If connections have been always properly disconnected after each use rather than cached, then the DBMS could assume that any active connection is a connection that has a session in-use for database commands. Accordingly, at some point, the currently open connections would be closed, and as long, as the DBMS opens new connections with a database server unaffected with the planned maintenance transparent to the application.

On the other hand, an arbitrary disconnection of an in-use session, by a DBMS due to a planned maintenance or for other purposes such as rebalancing, results in ambiguous errors returned to users, leading to user frustration, cancelled and duplicated work, and in the worst cases restart of applications and application related servers as valid transactions fail. Planned maintenance is an example of a possible operations that require that database sessions are released without disrupting applications. Other non-limiting examples of operations include re-balancing database sessions or workloads among database servers of a DBMS. The term "disconnection-requiring planned operation" (or simply "planned operation") refers to such an operation.

To gracefully close database sessions in a manner that does not disturb the application, the DBMS needs visibility into database session management within the application or the CPM to determine that all the connections with the database server can be safely disconnected. For an application (through the CPM or itself) that caches a connection, the sheer presence of a connection does not indicate to the DBMS that the connection or one or more sessions over the connection are actively used. A session may be actively used while no commands are being sent or the sessions of a connection may have been already used for commands by the application but the connection was never released to the CPM, or the application may not be using a CPM and has a connection with the DBMS that is always open. Additionally, even if the connection with no active sessions is promptly released to a CPM, the CPM may not be able to communicate with the DBMS about the connections that have been released by the application and are safe to disconnect. Such lack of communication may be due to a CPM being developed by vendors different than the DBMS and as such, missing one or more components necessary to communicate with the DMBS regarding open connections.

Accordingly, a DBMS may have no insight as to how the CPM and/or the application (the layers above the DBMS) are managing connections with the DBMS. Thus, the DBMS cannot safely disconnect the connections to perform a disconnection-requiring planned operation. New techniques for the DBMS to determine at what point to disconnect a database session, whether pooled or not pooled, are needed for minimizing application errors for disconnection-requiring planned operations.

BRIEF DESCRIPTION OF THE DRAWINGS

In the drawings of certain embodiments in which like reference numerals refer to corresponding parts throughout the figures.

DETAILED DESCRIPTION

Figure 1:
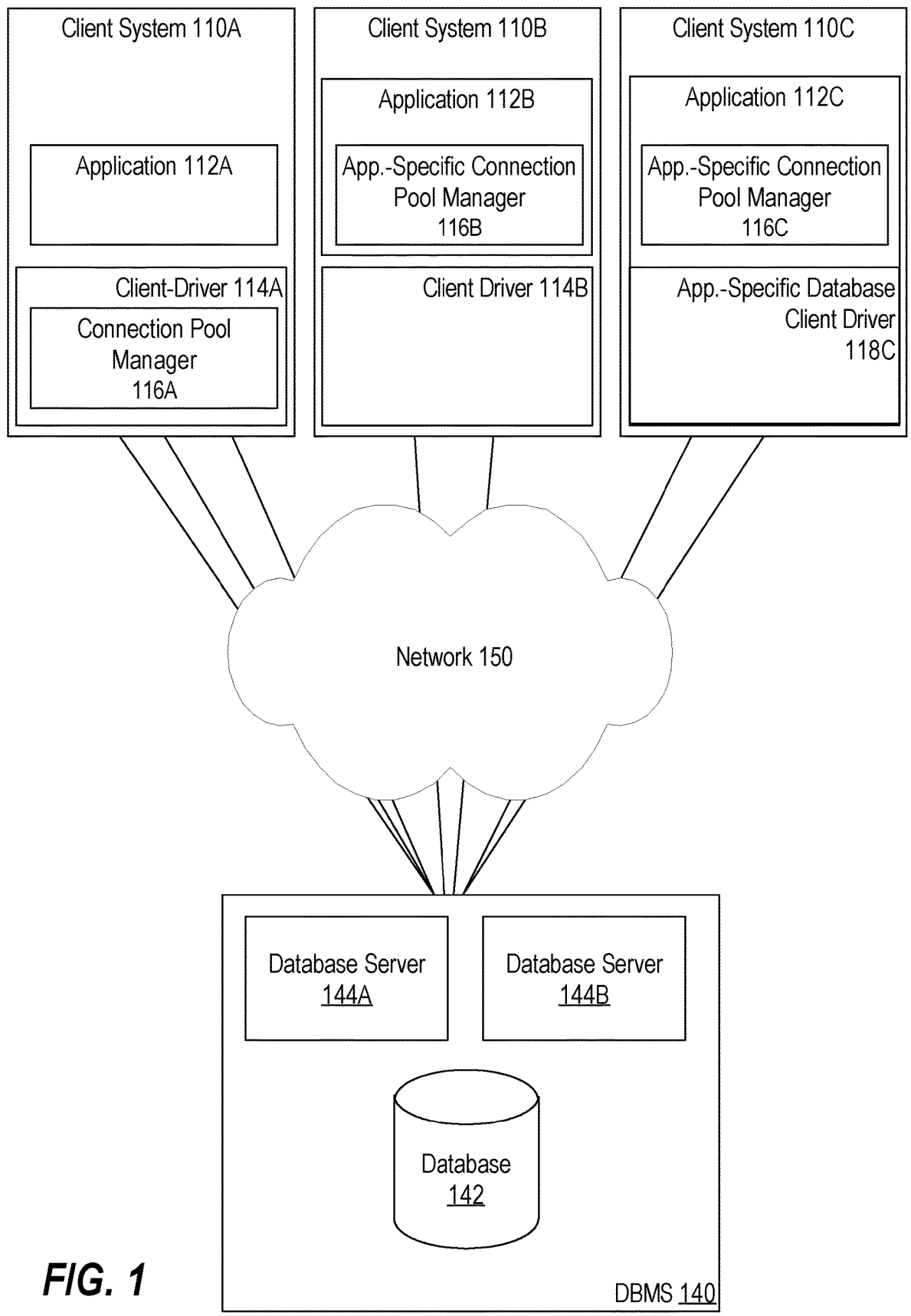
FIG. 1 is a block diagram that depicts a DBMS and connected one or more client computer systems hosting applications interfacing with the DBMS, in one or more embodiments.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approaches herein describe smart "draining" of database connections with a DBMS for a disconnection-requiring planned operation. The term "draining" refers to disconnecting/closing an established connection with a particular database server of a DBMS by determining a safe point to release one or more sessions over the connection and/or to disconnect the connections. The "safe point" term refers to a point in an application's runtime where the application may not be disturbed by the disconnection of the connection (or a session over the connection) used with the DBMS. Safe points include runtime points at which an application is borrowing or releasing a connection from a CPM, executing a connection test, beginning or completing a request, or when the connected DBMS can failover the connection used by the application because the database session states, if any, can be restored transparent to the application. At such a safe point, the session may be closed and, in some embodiments, a new session is opened at a target instance with the necessary states and objects restored.

In a disconnection-requiring planned operation on a database server, one or more services, running in the context of the database server, may be moved in advance of maintenance to another database server offering the same service, in an embodiment. The DBMS may send a notification to one or more of client-side drivers, CPMs, and/or any other subscriber of database events that such a maintenance is pending and may mark all database sessions to be released.

The "Database Client Driver" (or simply "Client-Driver" or "DCC") term refers to an application component that interfaces the application with a DBMS using the DBMS in a manner compliant with rules specified for the DBMS. For example, a compliant manner of interfacing may refer to the component having the ability to receive a notification from the DBMS about a disconnection-requiring planned operation and an ability to establish monitoring for determining a safe point in response to receiving the notification. A client component, such as a database client driver or a CPM, may not be fully compliant with the DBMS, if, for example, the component has been provided/developed by a different vendor than the DBMS, or if the component is outdated and is not fully compatible with all the functions of a version of a DBMS with which the application is interfacing.

In an embodiment, once notified of maintenance, one or more Client-Drivers or the DBMS itself start monitoring for safe points to disconnect one or more sessions and if needed, to migrate these sessions to another database or instance. In one embodiment, the DBMS marks the database sessions for draining and may not send any notification to the subscribers. The DBMS identifies safe points to drain the sessions by marking the sessions for release using techniques described herein. Once the last session of a connection is drained/released/disconnected, the connection may be disconnected as well.

In an embodiment, the DBMS, itself, may monitor for a safe point in one or more sessions. For example, the DBMS may monitor for a safe point as a single solution for both a capable (DBMS compliant) and a non-capable (a DBMS non-compliant) database client driver, and even for cases, when a notification is not possible to be sent to the Client-Driver.

In one embodiment, in response to the DBMS marking sessions for draining or the Client-Driver receiving a notification that a session needs to be released, the Client-Driver or the DBMS inspects the received client database requests, applies a set of rules to detect a safe point at which to disconnect a database session such that the application using the database session will not be disturbed. In such an embodiment, when a disconnection-requiring planned operation is initiated, the DBMS may initiate continuous monitoring of requests over database sessions until one or more of the set of rules are satisfied, and only then may disconnect the database session and/or fail the session over to a new instance, where a failover of a session is determined to be expected to succeed.

Detecting for a safe point to release a session may occur at one of at least three levels:
1) The CPM detection—in a pooled environment using compatible pools, the CPM identifies when connections are borrowed and released from usage;
2) Client-Driver detection—when notified, the Client-Driver initiates a detection for satisfaction of rules that indicate that the application is acquiring or releasing the session;
3) DBMS detection—the DBMS marks sessions to be released and initiates a detection for satisfaction of rules that indicate that the application is acquiring or releasing the session, or that the application is at a safe point where failover of the database session should succeed.

The first and second approaches cause a local (to application server) detection that does not reach the DBMS (referred herein as "local connection tests"). The third approach is applicable for any application (regardless whether the application server includes a Client-Driver).

Examples of such rules that indicate that a session can be released include:
a. Detecting a connection test over to test the validity of the database connection;
b. Detecting the application is outside of an application request boundary based on the received application request boundary commands. The term "request boundary" refers herein to a tag that indicates when a session is opened and when the session is released. Request boundaries may be communicated to a DBMS. The Client-Driver of the DBMS may also detect request boundaries;
c. Detecting a return of a database connection to a connection pool managed by a CPM within a Client-Driver;
d. Detecting that a database request is starting or ending—the term "database request" refers herein to a group of one or more database commands that are generated as a result of an application performing a unit of work; or
e. Detecting that the database session has one or more session states that are recoverable, and these session states may be re-established over a different session over a different connection with another a database server running an instance of the same database.

In an embodiment, once a DBMS or a Client-Driver detects a safe point to release a session matching one or more of the rules, the database session may be disconnected. A disconnection of a session may include a disconnection of the database connection when the session uses a dedicated connection. In an embodiment, in which a connection is shared between multiple sessions, a disconnection of a session may not cause the disconnection of the connection unless the disconnected session is the last active session on the connection. The reference to disconnecting/releasing a connection, unless stated otherwise, refers herein to disconnecting the last active session on the connection, if any, or disconnecting the session to which the connection is dedicated, if the session is still active.

Because the disconnection occurs at a safe point, the application is not disturbed and gracefully handles the disconnection with no interruption to the application.

In an embodiment, in response to disconnection, the application causes a new connection to be requested with the DBMS. This next connection may be further tested to ensure that it does not re-use a connection to database server instance for which a planned operation is performed. Thus, the process of connection testing may be repeated until all the affected connections are released by the DBMS, the Client-driver or the CPM.

When a new session over a new connection is assigned to the application, this may be with a new database server to where one or more services may have been previously migrated as part of the planned operation. The application may proceed to request the DBMS to execute one or more additional commands that the application may proceed to request the DBMS to execute over the disconnected database connection with the database server. The DBMS may successfully execute the next one or more commands on the new database server to which the DBMS has migrated the one or more services. Accordingly, the disconnection had no effect on the success of the execution of the next one or more commands that the application intended to request the DBMS to execute over the disconnected database connection with the database server.

In an embodiment, at a point at which the DBMS detects that no other database session exists with the database server and thus, all the database sessions with the database service have been successfully released, the DBMS may automatically start the planned operations of the database server or notify an administrator to start the planned operation or that load balancing or other operations have completed.

System Overview

FIG. 1 is a block diagram that depicts a DBMS and one or more client computer systems hosting applications interfacing with the DBMS, in one or more embodiments. Client systems 110A-C are connected to database servers 144A-B of DBMS 140 through network 150. Network 150 broadly represents a digital data telecommunications network comprising a communications network, such as a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), a cellular network or a combination thereof. Although only three client devices 110A-C are depicted, other embodiments may include more or less than three client devices. Similarly, other embodiments may include more or less database servers 144A-B and database 142.

In an embodiment, one or more of applications 112A-C are an application server, a mid-tier database application, and/or any other database-backed application that executes on computing devices of client systems 110A-C, respectively.

In an embodiment, one or more of applications 112A-C may interface with a DBMS using a Client-Driver on the client system. For example, client system 110A includes application 112A that interfaces with DBMS 140 using Client-Driver 114A. Client-Driver 114A, in this example, includes connection pool manager 116A. Client-Driver 114A, may interface with network interfaces of client system 110A to establish a connection with DBMS 140. Client-Driver 114A may communicate with DBMS 140 using database native calls. Connection pool manager 116A or application 112A may communicate with DBMS 140 by issuing driver specific calls to Client Driver 114A, which would translate the calls into native calls to DBMS 140 over one or more established connections. Although connection pool manager 116A is depicted in FIG. 1 as being part of Client Driver 114A, in other implementations, connection pool manager 116A may be separate from Client Driver 114A. The techniques described herein similarly apply to connection pool manager 116A whether or not connection pool manager 116A is part of Client Driver 114A or separate from Client Driver 114A.

In this non-limiting example, since Client System 110A includes database server compatible components such as Client-Driver 114A and Connection Pool Manager 116A of Client-Driver 114A, DBMS 140 may itself initiate a communication (notification) with the Client-Driver 114A to cause a particular action to be performed by client system 110A. For example, a disconnection-requiring planned operation may be initiated for database server 144A and one or more services of database server 144A may be migrated to another instance of the same database 144B by DBMS 140 or to another database that can offer the same service. DBMS 140 may issue one or more database events regarding the planned operation to the connected database client drivers of client systems. Client-Driver 114A may receive and parse such an event.

Using techniques described below, Client-Driver 114A may itself monitor connection(s) between database server 144A and application(s) on client system 110A, such as application 112A for a safe point. Accordingly, Client-Driver 114A may still detect a safe point in the connection(s) even if, in one example, application 112A never returns its connection(s) with database server 144A back to the connection pool of connection pool manager 116A.

Additionally or alternatively, Client-Driver 114A may cause connection pool manager 116A to monitor connection(s) with database server 144A for a safe point using techniques described below.

When the application server is not fully compatible, such as in the example of client system 110B, application 112B may utilize its own pool and directly request a connection from Client Driver 114B. Client-Driver 114B may receive and parse the notification for the planned operation on database server 144A. However, since connection pool manager 116B is not part of Client-Driver 114B, Client-Driver 114B may not be able to communicate with application-specific connection pool manager 116B to request monitoring for a safe point in connection(s) with database server 144A.

Instead, once notified, Client-Driver 114 may itself initiate the monitoring of connections and releasing connections itself. Using techniques described below, Client-Driver 114B may still detect a safe point in the connection(s) even if, in this example, connection pool manager 116B is not part of Client-Driver 114B.

In yet another example of a client system, in client system 110C, both the connection pool manager and the database client driver are application specific. Application 112C may utilize application specific connection pool manager 116C to manage the connections with database servers 144A-B and may further use application specific database client driver 118C to issue native calls to DBMS 140. In an alternative embodiment (not depicted in FIG. 1), client system 110C may not contain any connection pool manager and rather, may directly request a connection from application specific database client driver 118C. Accordingly, in this example, DBMS 140 may not be able to notify application specific database client driver about the planned operation on database server 144A. Thus, client system 110C may not be able to monitor for a safe point in connection(s) with database server 144A.

In an embodiment, regardless whether a client system contains a compatible client driver and pool manager (such as client system 110A) or contains only a compatible client driver (such as client system 110B) or no compatible component (such as client system 110C), DBMS 140 itself monitors for a safe point in the connection(s) when a disconnection-requiring planned operation is initiated. For example, database server 144A may receive the notification for the planned operation on database server 144A. The DBMS 140 may mark the database sessions for release, and monitor the database sessions that are marked for release for a safe point to close the session where the application will not notice. Using techniques described herein, database server 144A may itself detect a safe point in its own connection(s). Accordingly, even in the example of client system 110C which has no instrumented Client-Driver, a safe point in client system 110C's connection(s) with database server 144A may still be detected but by DBMS 140 itself.

Configuring a Safe Point to Drain

Many various connection tests may be used to test whether a connection is still active—standard SQL statement-based tests, API calls such as isValid, isUsable, isClosed, PingDatabase, or requesting the status from the connection object representing the connection, connection status, as non-limiting examples. In an embodiment, additional tests may be predefined and configured, invocation of which may indicate a safe point. Non-standard SQL statements tests may be added as well (see example queries below).

Draining may be performed at several levels:
(1) In an embodiment, the client system (such as an application server) has connection tests enabled to verify that connections are valid when releasing to the pool and when borrowing from the pool. Draining may be performed at the safe point of the connection tests. With no connection tests enabled, draining may be performed by the DBMS when the state of a connection, or more specifically, the state of a session over the connection is known, such as when a request boundary is received as described below.
(2) In an embodiment, in which a Client-Driver is performing the draining, the Client-Driver may have embedded rules that search for connection tests, for example those that may precede SQL tests. In such an embodiment, no configuration is needed for the client driver because the Client-Driver initiates the monitoring for those connection tests once it receives the notification for draining.
(3) In an embodiment, the DBMS may perform draining. The DBMS may be pre-configured with rules for draining sessions when sessions are marked to drain. In one embodiment, the DBMS may expose a programmatic interface for configuring rule data for detecting connections tests (e.g. standard and non-standard SQL queries for connection tests and other safe points where the database can failover the connection). The rules may be added, deleted enabled and disabled.
(4) The DMBS may failover sessions that do not drain at safe points where the session state is known and if the failover of the session is determined to be expected to succeed.

In an embodiment, the DBMS is configured as to which one or more of the rules are applied for detecting a safe point and closing a session. The rule data for the DBMS may include the description of one or more rules to be applied to a database session to detect a safe point (non-limiting examples of rules are described above). Predefined rules may be enabled and disabled. Custom rules may be added for applications that use non-standard connection tests.

The application may embed request boundaries. In an embodiment, in which a DBMS receives a request boundary, rule data at the DBMS may cause draining the session for which the request boundary is received. For example, when a client of an application initiates a request for work with the application, the request boundary may be detected by the Client-Driver and/or the DBMS, indicating that the application is initiating a new request from the client. (The request boundary may be embedded in a database request and may be received with the first call of the database request or the last call of the database request as a piggyback, for performance reasons.). When a session has been marked to drain at a DBMS or the Client-Driver upon receiving a notification of a planned operation, the receipt of the request boundary by the Client-Driver or the DBMS may constitute the detection of the safe point for the application.

In another example, an application may process a client request by initiating transaction(s) and requesting database commands to be performed by the DBMS. When the application has finished processing the client request and is ready to respond, the application may send to the DBMS an end of request boundary on the last call of the request, standalone, or on the first call of the next request, as an indication that the request has ended. The receipt of such an application boundary request may similarly constitute a detection of the safe point for the session to be released or failed over by the DBMS.

In an embodiment, request boundaries are not event notifications. Rather request boundaries are standard tags sent to a DBMS by an application through the Client-Driver. As a non-limiting example, when a web application receives an http request for a resource (such as a web page) from a client device, the web application may use request boundaries to demarcate requests for borrowing and returning a database connection from its own connection pool. After using a database connection for one or more commands, the Client-Driver and the DBMS can detect whether the client application request's connection is in use or is outside of the request boundaries. Accordingly, in such examples, the DBMS and client driver each know when the application is outside of the application request boundaries or that a request has ended, the database connection used (or to be used) by the application may be safely released by the client driver or by the DBMS.

In an embodiment, a client system may match the connection test to the rule data used in a DBMS or the Client-Driver for the connection validity test. The rule data may specify the exact application programmatic interface call used to test the validity of a database connection. For example, the rule data may specify that a ping interface tests the connection validity by the application or may specify a particular connection validity API call to the Client-Driver for the same purpose. In an embodiment, all tests supported by a Client-Driver and/or a DBMS are enabled, and are used only when connections are marked or notified for release. The DBMS and the Client-Driver may be configured to enable and disable standard and custom tests.

In another embodiment, the rule data in a DBMS specifies that a test statement is sent over a database connection for testing the validity of the connection. The rule data may additionally or alternatively specify the content of one or more connection test queries. As a non-limiting example, the rule data may specify the one or more of the following queries for testing the validity of the connection:

"SELECT 1 FROM DUAL",
"SELECT USER FROM DUAL",
"SELECT COUNT(*) FROM DUAL"
SELECT 1
BEGIN NULL; END;

The rule data may also enter and enable non-standard SQL connection tests that the application uses to test the validity of connections.

Either a DBMS or a Client-Driver may detect a safe point using the contents of rule data using techniques described below. In an embodiment, in which no rule data is specified, a DBMS or a Client-Driver may not limit monitoring for a safe point to any particular rule data described above and may apply any one of the rules and respective configurations described above to detect a safe point.

In an embodiment, a DBMS or a Client-Driver may use heuristics to determine the particular one or more rules to apply for detecting a safe point. For example, if the DBMS/Client-Driver detects a safe point using a request to execute a specific test statement, the DBMS/Client-Driver may configure itself to monitor for the same specific test statement when sessions are marked for draining. Similarly, if the DBMS/Client-Driver detects a safe point by receiving a particular API call from the application, the DBMS/Client-Driver may configure itself to monitor for the same particular API call next time a planned operation is initiated.

When Application Continuity or Transparent Application Failover (TAF) (or other failover techniques) are enabled, the DBMS may know that recovery may succeed, and that there is little or no recovery to be done, and disconnect the session at such a safe point. This is a "smart" form of failover when no safe point may be identified to drain a session but rather, the DBMS determines that the failover of the session is expected to succeed.

Application Continuity and Transparent Application Failover are further described in U.S. Pat. No. 9,591,103 (filed on Jun. 24, 2015 and issued on Mar. 7, 2017); U.S. Pat. No. 9,779,116 (filed on Jul. 5, 2013 and issued on Oct. 3, 2017); U.S. Pat. No. 9,600,371 (filed on Jul. 5, 2012 and issued on Mar. 21, 2017), the entire contents of which are hereby incorporated by reference for all purposes as if fully set forth herein.

The DBMS may look for places where the session state on the connection is known to be recoverable and no transaction is open. The DBMS may then close the session. Application Continuity or TAF or other failover techniques perform failover of the session to a new database instance offering the same service, doing so with no interruption to the application. Application Continuity (or TAF) will open another session at a new instance and restore the session state data and cursors so the application continues to seamlessly operate.

Opening a Database Connection

Figure 2:
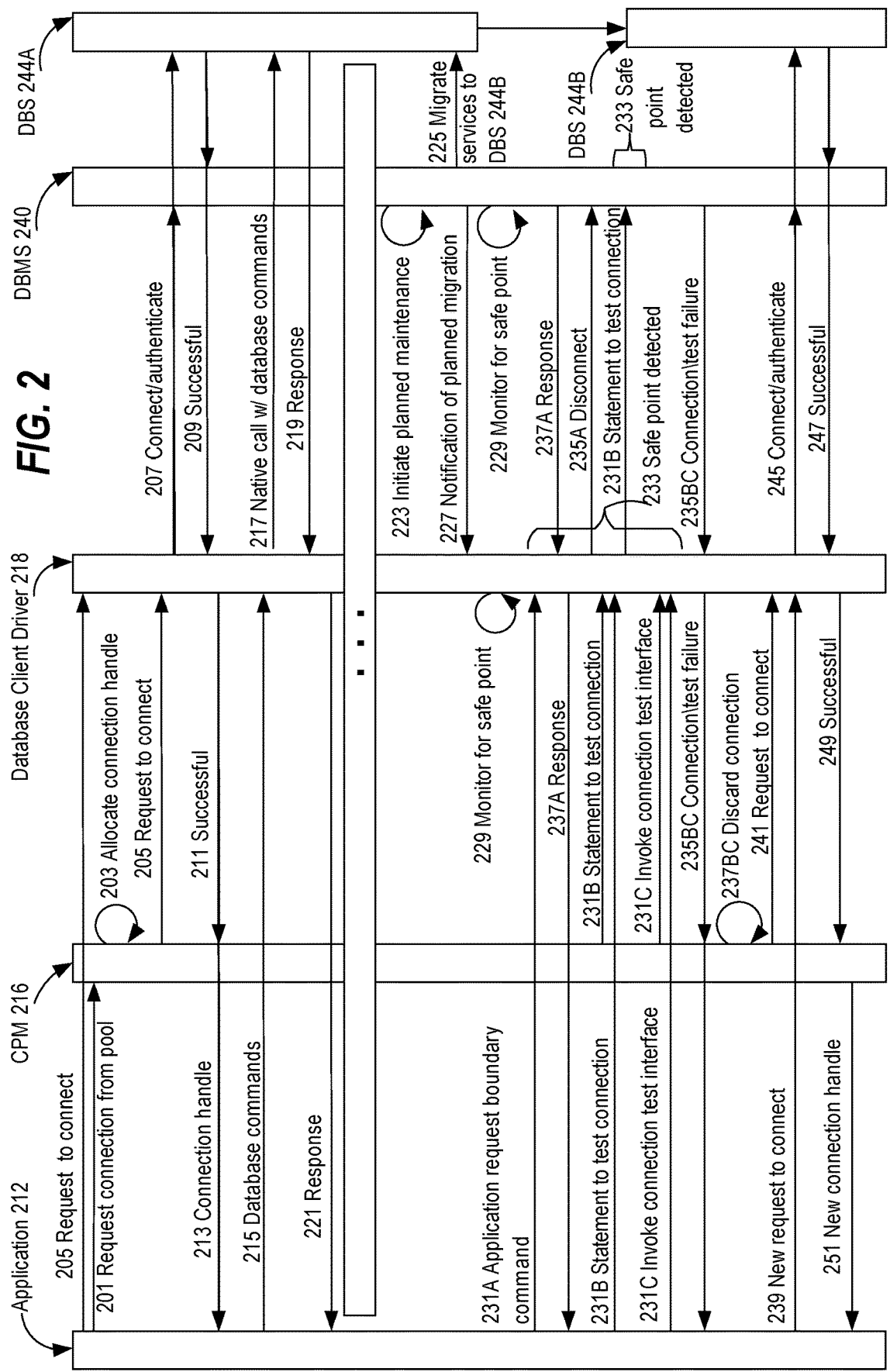
FIG. 2 is a sequence diagram that depicts detecting a safe point in a database connection and draining the database connection, in one or more embodiments.

FIG. 2 is a sequence diagram that depicts detecting a safe point in a database connection and draining the connection, in one or more embodiments. At step 205, application 212 requests a client driver 218 to connect to database server (DBS) 244A of DBMS 240 for application 212 to issue one or more database commands over the database connection. Alternatively, if application 212 utilizes a database connection pool managed by CPM 216, application 212 may request from CPM 216 a database connection to DBS 244A from the pool at step 201. If a pool has no connection available for application 212, at step 203, CPM 216 allocates a new handle for a new database connection and requests database client driver 218 to connect with DBMS 240 at step 205.

At step 207, database client driver 218 connects with DBS 244A of DBMS 240 regardless of whether application 212 or CPM 216 has requested the database connection. As part of a connection protocol, database client driver 218 may provide to DBMS 240 authentication/authorization information from application 212. Once the database connection is successfully established with DBS 244A, at step 209, DBMS 240 returns a response to database client driver 218, which may in turn propagate the response to CPM 216 or application 212 at step 211. Application 212 obtains, at step 213, the connection handle for the newly established database connection.

In an alternative embodiment, CPM 216 may already have a connection with DBMS 244A available in the managed connection pool. In such an embodiment, CPM 216 returns the connection handle for the available connection to application 212 and indicates that the connection is in-use.

In an embodiment, continuing with FIG. 2, at step 215, application 212, using the acquired connection, may issue various database commands to database client driver 218 for DBS 244A. Database client driver 218 translates these commands into native calls to DBS 244A and requests the execution of commands at step 217. DBS 244A may respond to the native calls with the results of the execution, at step 219, which are propagated to application 212 at step 221. The database commands may include one or more database statements of any type, such as DML (Data Manipulation Language), DDL (Data Definition Language), DCL (Data Control Language), TCL (Transaction Control Language) commands for local or global transactions.

Application 212, as well as other applications, may open the number of connections with DBS 244A to request execution of database commands. At any point, the executions of the database commands may be at different stages. Such stages may not be readily recognizable by the DBMS and may make a false impression on the DBMS that a connection is not in-use. Even if one database command (even a whole transaction) that was sent over a connection has completed its execution and has returned the result to an application, the application may need to issue an additional database command, which depends on the result from the previous database command, over the connection. Accordingly, DBMS may not be able to arbitrarily disconnect a database connection without a possible adverse effect on the application.

The connection pool management may be owned by a third-party application server or application (as depicted Client System 110B of FIG. 1, as an example). In such an embodiment, the Client-Driver and DBMS only detect a request for a new connection. Neither, the Client-Driver, nor the DBMS can detect the borrowing from and release to the non-compliant connection pool. The pool management is not visible to the client driver or DBMS, thus request boundaries or connection tests may be the only way to detect that a connection is not any longer in use.

Initiating Release of Database Sessions

In an embodiment, a disconnection-requiring planned operation may be initiated automatically or at a request of a database administrator (DBA). A planned operation may include an update of software or hardware components on one or more computing devices hosting a database server, and thus may require a restart of a database server or a service thereof. Accordingly, the maintenance may cause service(s) of the database server to be stopped for some time period, closing open connections and preventing database command executions for applications that were connected with the database server. A rebalancing of work may similarly require releasing sessions at one database instance and reopening them at another database instance.

In an embodiment, to alleviate the consequences of maintenance, the DBMS migrates the database sessions to one or more computing devices that are not affected by the planned operation. The DBMS may spawn another mirror instance of a database server or migrate affected service(s) to another existing database server.

Continuing with FIG. 2, at step 223, a disconnection-requiring planned operation on DBS 244A is initiated by DBMS 240. DBMS 240 may request one or more services to migrate to a new instance of a database server, DBS 244B at step 225. Such a migration may cause all the current sessions to be moved to the new instance. Accordingly, when a new connection is requested with database server 244A, DBMS 240 opens a connection with the new instance of database server, DBS 244B. DBS 244B may now execute one or more additional database commands from the application.

However, even after a new instance of database server is ready to execute database commands for the affected database server, the existing connections with the affected database server cannot be simply migrated to the new database server. To migrate such connections, the connections need to be disconnected, and the application(s) using these connections need to reconnect with the DBMS in order to establish connection(s) with the new database server.

Therefore, to minimize impact on connected application(s), rather than disconnecting at arbitrary point(s), a DBMS or a Connection Pool Manager, or a Client-Driver may detect safe point(s) and drain the existing connection(s) with the affected database server at the safe points to minimize any adverse effect on the application(s). These safe points are defined in one or more rules that are applied when a disconnection-requiring operation is initiated, in an embodiment.

Continuing with FIG. 2, at step 227, DBMS 240, itself, may initiate detection of safe point(s) in existing connection(s) with DBS 244A itself. The DBMS may mark sessions for draining, and start monitoring these sessions for safe points to drain. The operation may also send notification to a Client-Driver of DBMS 240, such as database client driver 218, to monitor safe point(s) in connections with DBS 244A.

Boundary Based Safepoint

In an embodiment, in which database client driver 218 is a Client-Driver of DBMS 240, the notification, from DBMS 240 about a planned operation, triggers database client driver 218 to monitor for a safe point in connection(s) with DBS 244A at step 229. The DBMS may mark sessions for draining, and start monitoring these sessions for safe points to drain.

Database client driver 218 or DBMS 240 may detect a safe point by monitoring for request boundaries from the application 212. In one embodiment, database client driver 218 is a Client-Driver, and application 212 is configured to issue, at step 231A, a beginning request boundary when application 212 is about to start a new unit of work that may require the database interface to invoke database commands. When using request boundaries, the application 212 also issues an ending request boundary, at step 231A, at a logical point at which application 212 has finished performing the unit of work over the connection and does not expect to invoke the database interface for that unit of work. In an embodiment, when a request boundary is issued, a request boundary marker, such as "beginRequest" or "endRequest", for start and end of a new unit of work, is inserted into a database command sent to the Client-Driver.

Since the unit of work is associated with application 212's work cycle, at the end or before the beginning of such cycle database client driver 218 may assume, at step 233, that a safe point has been reached by application 212. In another embodiment, DBMS 240 may detect request boundaries. In such an embodiment, the client driver of application 212 will propagate the request boundaries to DBMS 240. DBMS 240, as part of its monitoring, will detect the beginning request boundary and/or the ending request boundary.

In an embodiment, a request boundary may be accompanied with the last one or more database commands for the particular database request 215/217. In such an embodiment, Client-Driver 218 or DBMS 240 may not determine that a safe point is detected on the connection until the response from DBMS 240 is forwarded to application 212 at step 237A. At step 235A, Client-Driver 218 may disconnect the database session DBMS 240 because a safe point, denoting the end of the database request, was detected at step 233, and the response was received at step 237A.

Connection Test Based Safe Point

Applications and/or CPMs may periodically request to test the validity of existing database connection(s) to determine whether the connection(s) are still active and thus, commands can be sent over the connection(s) to a DBMS. As non-limiting examples, such a connection test request may be regularly caused by an application when the application requests a database connection from a connection pool or when the application returns a database connection to the connection pool or before the application issues long running batch commits. Although, in some embodiments, the connection test request may be caused by a client component that is not (at least fully) compliant with the DBMS, the fact that such a request is generated indicates that the client application component, regardless of its compliance with the DBMS, should be able to gracefully handle a negative response from the DBMS or the Client-Driver without disturbing the application.

In an embodiment, for a database server of the DBMS for which a disconnection-requiring planned operation has been initiated by the DBMS, the DBMS or the Client-Driver detects a safe point in a session when such a connection test request is detected. The detection of the safe point may be based on the enabled pre-configured rule set as discussed above. In response to the detection of safe point in a database connection, the DBMS or the Client-Driver may return that the connection is invalid and disconnect the database session. Since the application component itself requested the test for validity of the connection, the application should be able to handle the negative response and unavailability of the database session.

Figure 3:
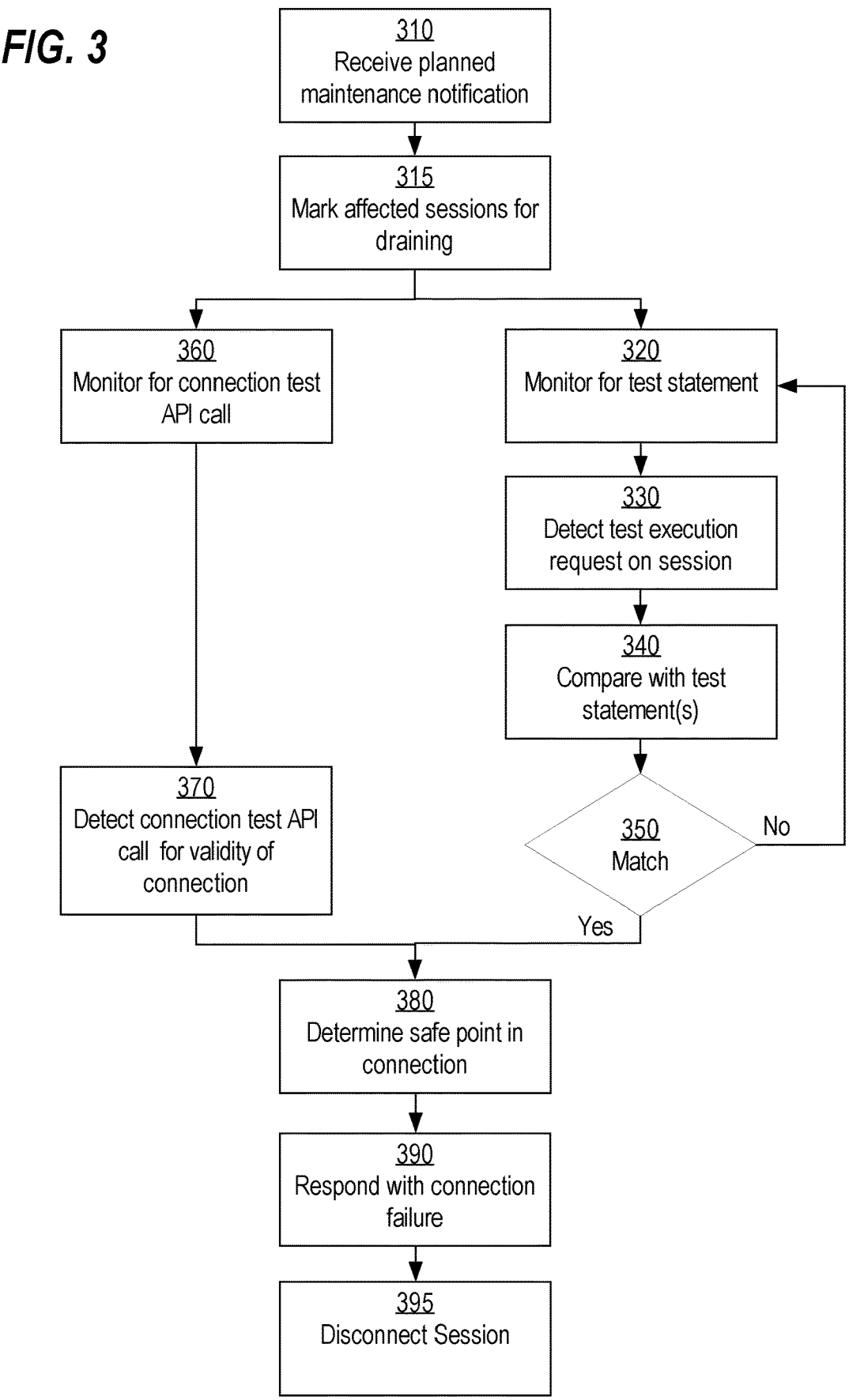
FIG. 3 is a flow diagram that depicts a process for disconnecting a connection based on detecting a test of the connection, in an embodiment.

FIG. 3 is a flow diagram that depicts a process for disconnecting a session based on detecting a test of the connection for the session, in an embodiment. At step 310, a DBMS or a Client-Driver receives a notification of a planned operation affecting one or more database sessions and requiring a service or an instance servicing the sessions to be stopped. At step 315, the DBMS or the Client driver may identify such sessions and may mark them for draining. This step may automatically trigger the monitoring steps of 320 and 360 based on the enabled rule set for connection draining discussed above.

In an embodiment, the DBA may decide which rules for detecting a safe point are enabled and configure the rule set accordingly by adding, enabling or disabling connection test rules. If an API call or a test statement received from the application, matches the enabled rule set, then the DBMS may determine that a safe point has been detected for the session. For a session that is marked for draining, when a rule is matched, the DBMS closes the session cleanly and returns a negative response to the connection test. Because the application is ready to handle the connection test, the application is expected to gracefully open another connection.

In one embodiment, at step 360, a Client-Driver that received the notification at step 310, monitors API calls to the Client-Driver for connection tests. In such an embodiment, the Client-Driver may have been configured for monitoring and detecting connection test calls to the interface(s) using techniques described above. At step 370, the Client-Driver detects a connection test API call. Using the call data and/or the configuration, the Client-Driver may determine, at step 380, whether the call is to test the validity of a connection with the database server under maintenance. If so, the Client-Driver determines that a safe point has been detected for the session.

In an alternate embodiment, the DBMS may have been configured for monitoring and detecting connection test calls to the interface(s) using techniques described above. At step 370, the DBMS itself detects a connection test API call. Using the set of enabled rules, the DBMS may determine, at step 380, whether the call is to test the validity of a connection with the database server under maintenance. If so, the DBMS determines that a safe point has been detected for the session.

One example of interface call-based detection of a safe point for a database connection is depicted in FIG. 2. Continuing with FIG. 2, application 212 or CPM 216 may invoke a connection test interface of database client driver 218, at step 231C, to test the validity of the connection with DBS 244A initiated at steps 205-213. The invocation may be in a form of a JDBC/OCI/ODBC call to database client driver 218. Non-limiting examples of such a call include a request for the value of the "Connection. State" attribute of the connection handle, method calls "isValid( )", "isUsable( )", "isClosed( )" using the connection handle, or a ping request, such as "PingDatabase", using the connection handle. Application 212 or CPM 216 may issue such one or more calls to test the connection with DBS 244A rather than use the connection to issue database commands. If one or more of invocations for testing the connection are detected by database client driver 218, then database client driver 218 may determine that a safe point is detected for the connection, and application 212 is not using the connection for substantive work/commands.

Alternatively or additionally, at step 320, the Client-Driver or the DBMS may monitor for a request to execute a connection test statement on a connection with the database server, for which the notification of planned operation has been received at step 310. To detect a connection test statement execution request on the connection, at step 330, the Client-Driver or the DBMS may examine content of any statement execution request over the connection. The statement execution requests may be embedded in one or more database commands for which an application calls the Client-Driver interface to execute on the database server using the connection. At step 340, the Client-Driver or the DBMS may compare the content of the application request (such as an API call) to a pre-configured set of connection test queries. The connection test queries may have been configured using the techniques discussed. As discussed, standard tests may be enabled and additional custom tests may be added by a database administrator to create a rule set. At step 350, if the content of the application request matches any one of the connection test queries, the Client-Driver or the DBMS determines that the session is at a safe point at step 380 and that the session may be closed.

For example, continuing with FIG. 2, application 212 or CPM 216 may request the database client driver 218 to execute a statement on the connection with DBS 244A. Since database client driver 218 is monitoring for a safe point for sessions to be closed for DBS 244A, database client driver 218 may compare the statement to an enabled set of rules to determine whether the requested statement is an enabled rule for draining. If matched, then database client driver 218 may determine that a safe point has been detected for the connection because application 212 or CPM 216 is testing the connection rather than using the connection for substantive commands to DBS 244A. The Client-Driver closes the session and returns a negative result for the connection test in such an example.

In an embodiment, the target DBMS itself determines a safe point for draining sessions. Once the DBMS receives a notification of a planned operation at step 310, the DBMS marks the sessions to be drained. When sessions are marked, the DBMS itself monitors for the enabled set of connection tests at step 320. At step 330, the DBMS may detect a test statement for a connection test over the connection as part of its processing of statement requests. For example, during the parsing of a statement, the DBMS may compare the received statement with the pre-configured connection test queries, at step 340. The DBMS may store pre-configured connection test queries in a configuration table and load them for comparison at step 320. If an issued statement received from the API call, at step 350, matches one or more of the pre-configured connection test queries in the enabled rule set, then, at step 380, the DBMS may determine that a safe point has been detected for the session.

An example of a DBMS detecting a safe point is depicted in FIG. 2. Continuing with FIG. 2, data base client driver 218 may not provide a fully-compliant interface for DBMS 240, and DBMS 240 may itself determine a safe point in the connection with DBS 244A. For example, in response to the initiation of a planned operation and/or receiving the planned operation notification at step 223, DBMS 240 may monitor for a safe point in the connection with DBS 244A at step 229. At step 231B, a request to execute a statement to DBS 244A is received using the connection. At step 233, DBMS 240 compares the received statement to the SQL statements in pre-configured connection test rules and determines that the application 212 or CPM 216 has requested a test of the connection. Since application 212 or CPM 216 is testing the connection rather than using the connection for substantive database commands to DBS 244A, DBMS 240 may determine that a safe point is detected in the connection at step 233, close and cleanup the database session, and return a negative response for the connection test API. At such a safe point, the application 212 or CPM 216 should gracefully handle the negative response returned in response to the test API, and try a different session.

Continuing with FIG. 3, at step 380, the DBMS or the Client-Driver determines that a safe point in a connection has been detected based on the detection of a connection test request using the techniques discussed above. At step 390, regardless of the actual state of the connection and regardless whether the connection is in fact valid, usable and/or otherwise functioning, at step 390, the DBMS/Client-Driver responds to the connection test request indicating a failure in the connection. The component issuing the connection test request (a database client driver or CPM or application) should be able to handle the negative response, as the component itself requested to test the connection in the first place. Therefore, upon the receipt of the failure status for the connection test, the issuing component may itself disconnect and/or discard the connection at step 395. In another embodiment, the DBMS/Client-Driver that detected the safe point disconnects the session and cleans up at step 395.

An example of disconnecting a database connection determined to be at a safe point is depicted in FIG. 2. Continuing with FIG. 2, when DBMS 240 determines a safe point at step 233, DBMS 240, at step 235BC, returns connection failure to database client driver 218, regardless of the actual state of the connection.

At step 235BC, if CPM 216 had requested the connection test at steps 231B or 231C, database client driver 218 may further propagate the error status to CPM 216. In response to the error outcome for the connection test, CPM 216 may close the connection at step 237BC. By simulating a failed connection, the DBMS and the Client Driver force a valid connection that is affected by disconnection-requiring operation to be closed without any negative impact to the application.

If additional connections with DBS 244A still exist in the connection pool managed by CPM 216, upon receipt of the error for the connection test API, CPM 216 may test the next connection with DBS 244A from the pool. The connection test for the next connection may similarly return an error outcome for the connection test API as DBMS 240 or database client driver 218 would similarly detect a safe point for the next connection as well. Accordingly, in such an example, CPM 216 may exhaust all connections with DBS 244A by iteratively testing the next connection with DBS 244A in the pool and so draining out the connection pool for those connections only that are connected to the instance or service that needs to be released. Accordingly, only connections to the service or instance being drained are released.

The CPM 216 may request a new connection with DBS 244A at step 241 or the CPM may find a new connection with DBS 244B from the connection pool as the service is active already at another instance. For new connections, the database client driver may connect with DBMS 240, which may establish the connection with DBS 244B, rather than DBS 244A, at step 247. Database client driver 218 may return the new connection to CPM 216 for management. If application 212 requests a new connection from CPM 216, the CPM 216 may return the new connection with DBS 244B to the application 212.

CPM 216 may now use this new valid connection that is to a new database instance, DBS 244B, which is not being drained. In an embodiment, in which the connection pool of CPM 216 contains existing connections with the new database instance, DBS 244B, the connection test API will succeed because the sessions for the new instance are not marked for draining. In this case, CPM 216 may use any of these existing connections with DBS 244B and does not need to request a new one.

Alternatively, at step 235BC, if application 212 had requested the connection test at steps 231B or 213C, database client driver 218 may propagate an error status to application 212. In response to the connection test error status, application 212 may try to re-establish the connection by requesting another connection with DBMS 240 at step 239. Database client driver 218 may test the new connection and the connection test API returns success.

For example, upon the successful connection test API, DBS 244B propagates the successful status to database client driver 218 at step 247 and/or to CPM 216 at step 249. Application 212 receives a new connection handle, at step 251, and may use this valid connection handle to request database commands for subsequent work.

Smart Failover Safe Point

For sessions that the DBMS, the DBMS may detect an appropriate place to failover the sessions where failover is determined to be expected to succeed, in an embodiment. A smart failover point is detected by the DBMS for sessions that are marked for draining and have, as non-limiting examples, a) Application Continuity, TAF and/or other failover technology are enabled, b) there is no transaction open, c) session and database objects are closed or recoverable, and d) session state is known and can be restored at failover in another session. At such a smart failover point, the session may be closed and a new one opened at a target instance with the states and objects restored.

Database Management Systems

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the invention are described herein using the term "SQL", the invention is not limited to just this particular database query language, and may be used in conjunction with other database query languages and constructs.

A client may issue a series of requests, such as requests for execution of queries, to a database server by establishing a database session, referred herein as "session." A session comprises a particular connection established for a client to a database server, such as a database instance, through which the client may issues the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

Database services are associated with sessions maintained by a DBMS with clients. Services can be defined in a data dictionary using data definition language (DDL) statements. A client request to establish a session may specify a service. Such a request is referred to herein as a request for the service. Services may also be assigned in other ways, for example, based on user authentication with a DBMS. The DBMS directs requests for a service to a database server that has been assigned to running that service. The one or more computing nodes hosting the database server are referred to as running or hosting the service. A service is assigned, at run-time, to a node in order to have the node host the service. A service may also be associated with service-level agreements, which are used to assign a number nodes to services and allocate resources within nodes for those services. A DBMS may migrate or move a service from one database server to another database server that may run on a different one or more computing nodes. The DBMS may do so by assigning the service to be run on the other database server. The DBMS may also redirect requests for the service to the other database server after the assignment. In an embodiment, after successfully migrating the service to the other database server, the DBMS may halt the service running in the original database server.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system may be allocated to running a particular database server's software. Each combination of the software and allocation of resources from a node is a server that is referred to herein as a "server instance" or "instance". A database server may comprise multiple database instances, some or all of which are running on separate computers, including separate server blades.

Software Overview

Figure 4:
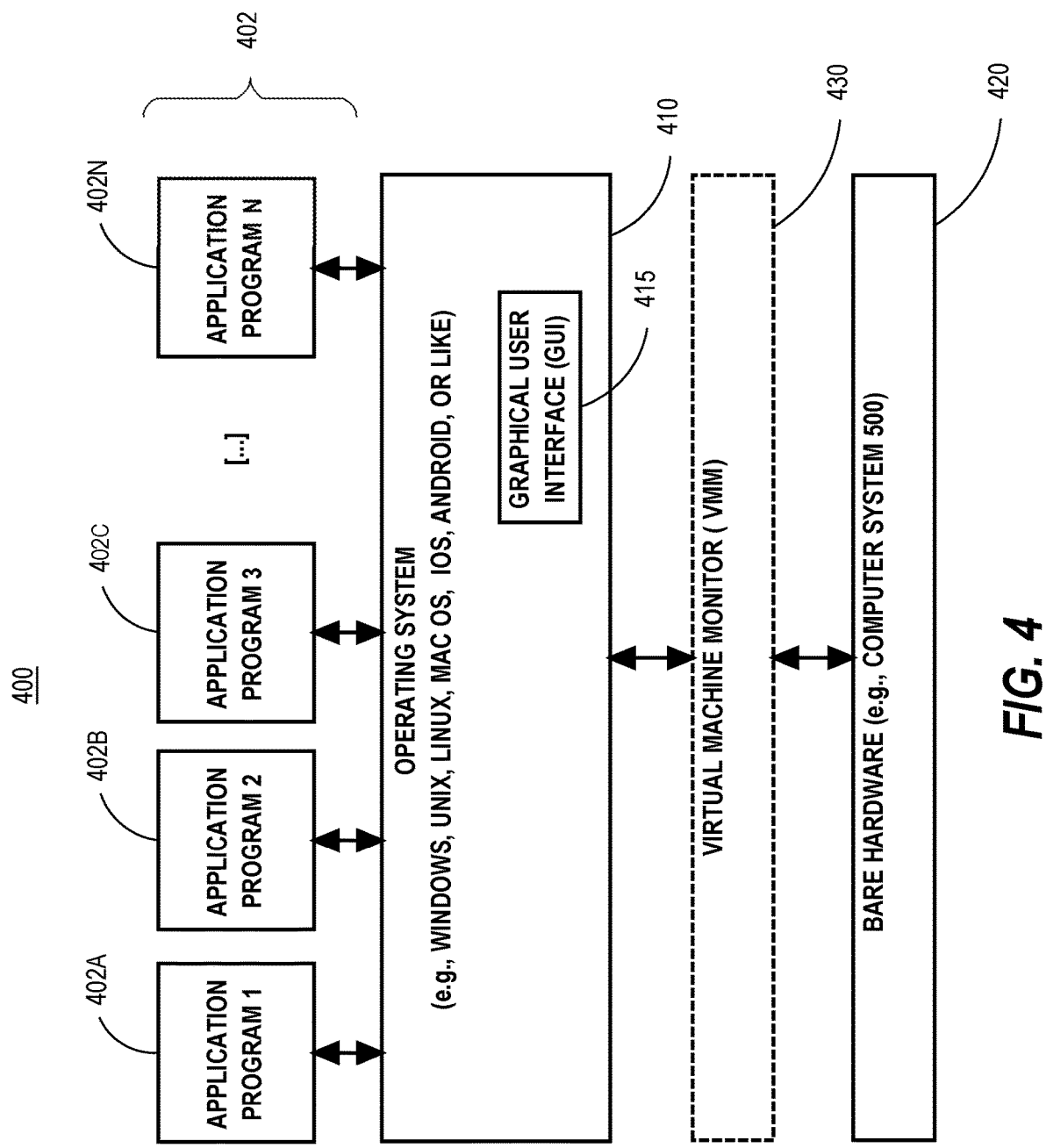
FIG. 4 is a block diagram of a basic software system, in one or more embodiments.
Figure 5:
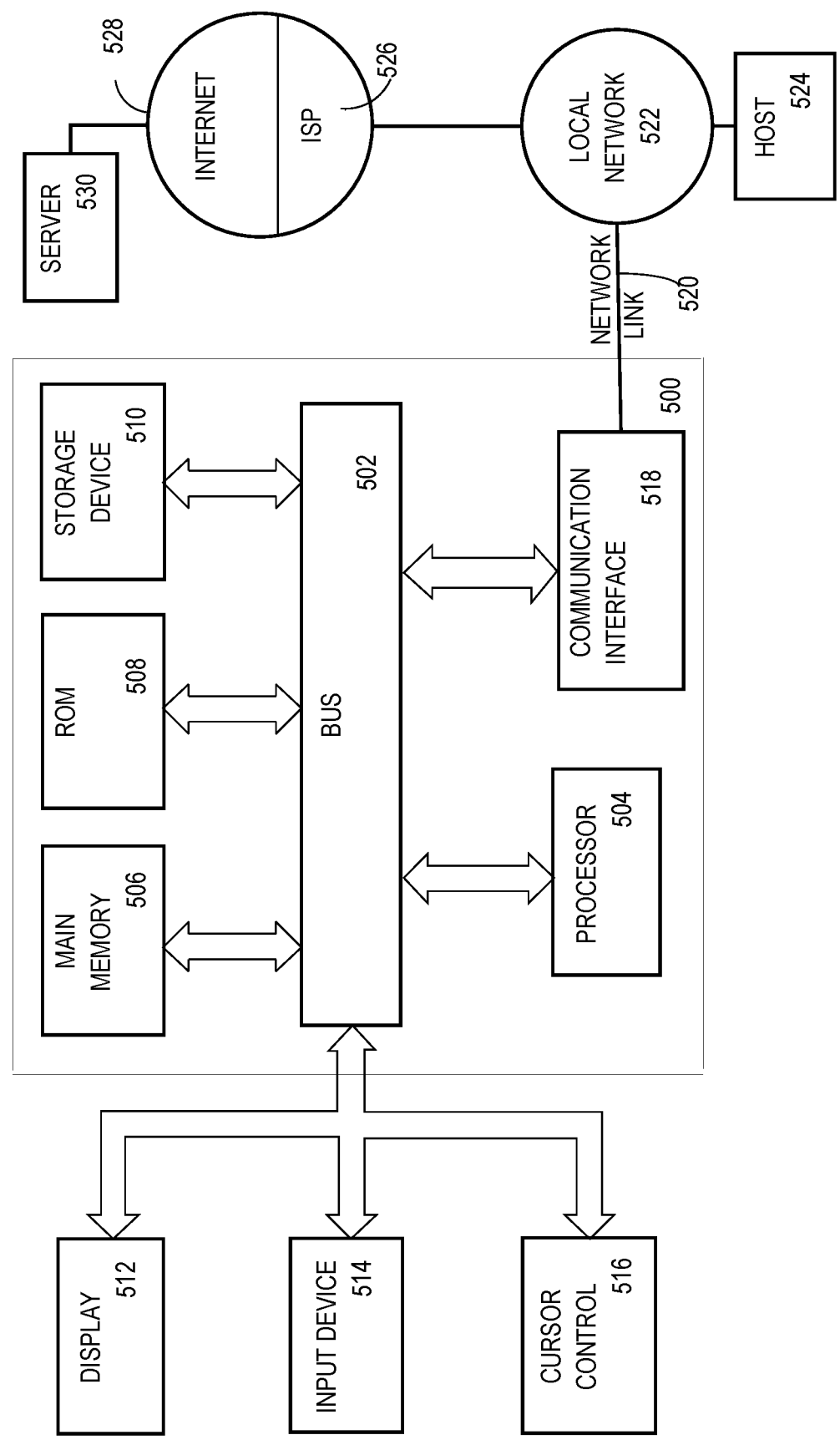
FIG. 5 is a block diagram that illustrates a computer system upon which an embodiment of the invention may be implemented.

FIG. 4 is a block diagram of a basic software system 400 that may be employed for controlling the operation of computing system 500 of FIG. 5. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 500. Software system 400, which may be stored in system memory (RAM) 506 and on fixed storage (e.g., hard disk or flash memory) 510, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 510 into memory 506) for execution by the system 400. The applications or other software intended for use on computer system 500 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 504) of computer system 500. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 500.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 500 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 46 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 46, or other non-volatile storage for later execution.

Computing Nodes and Clusters

A computing node is combination of one or more hardware processors that each share access to a byte addressable memory. Each hardware processor is electronically coupled to registers on the same chip of the hardware processor and is capable of executing an instruction that references a memory address in the addressable memory and that causes the hardware processor to load data at that memory address into any of the registers. In addition, a hardware processor may have access to its separate exclusive memory that is not accessible to other processors. The one or more hardware processors may be running under the control of the same operating system.

A hardware processor may be comprise multiple core processors on the same chip, each core processor ("core") being capable of separately executing a machine code instruction within the same clock cycles as another of the multiple cores. Each core processor may be electronically coupled to connect to a scratch pad memory that cannot be accessed by any other core processor of the multiple core processors.

A cluster comprises computing nodes that each communicate with each other via a network. Each node in a cluster may be coupled to a network card or a network integrated circuit on the same board of the computing node. Network communication between any two nodes occurs via the network card or network integrated circuit on one of nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for closing one or more database sessions with a database management system (DBMS) as part of a planned operation, the method comprising:
   receiving a request for the planned operation for a first database server of the DBMS;
   receiving, over a first database session over a first database connection with the first database server, one or more requests from a client system;
   based on the one or more requests, determining a safe point for the first database session with the first database server at which the first database session of the client system with the first database server can be closed without affecting successful execution of one or more additional commands that the client system may request the DBMS to execute;
   in response to the one or more requests, while the first database session has a valid status, providing to the client system a return status indicating an invalid status for the first database session over the first database connection with the first database server;
   after returning the return status to the client system, causing the first database session, over the first database connection, with the DBMS to close.

2. The method of claim 1, further comprising, based on the one or more requests, determining a safe point for the first database session with the first database server by determining that the one or more requests include a request to test a validity of the first database connection with the first database server.

3. The method of claim 1, further comprising, based on the one or more requests, determining a safe point for the first database session with the first database server by determining that the one or more requests include a request boundary.

4. The method of claim 1, further comprising:
   initiating the planned operation of the first database server of the DBMS;
   sending to the client system a notification of the planned operation of the first database server;
   wherein the notification indicates stopping of a service on the first database server or stopping of the first database server;
   the notification causing monitoring for safe points to close one or more database sessions with the DBMS that include the first database session.

5. The method of claim 1, further comprising:
   initiating the planned operation of the first database server of the DBMS;
   migrating one or more services from the first database server to a second database server of the DBMS.

6. The method of claim 1, further comprising:
   initiating the planned operation of the first database server of the DBMS;
   migrating one or more services from the first database server to a second database server of the DBMS;
   wherein the return status indicating the invalid status for the first database session causes the client system to request a different, a second database connection, to connect with the DBMS;
   after initiating the planned operation of the first database server, receiving the request for the second database connection;
   in response to receiving the request for the second database connection, establishing the second database connection with the second database server of the DBMS.

7. The method of claim 1, wherein determining a safe point for the first database connection with the first database server comprises:
   receiving, over the first database connection, a request to execute a particular statement on the first database server;
   determining that the request to execute the particular statement is to test a validity of the first database connection of the client system with the first database server of the DBMS.

8. The method of claim 7, further comprising:
   storing one or more connection test statements for testing a validity of one or more database connections with the DBMS;

receiving a request to enable testing the validity of one or more database connections with the DBMS using the one or more connection test statements;

in response to enabling testing the validity of one or more database connections with the DBMS using the one or more connection test statements, comparing the particular statement with the one or more connection test statements to determine whether the request to execute the particular statement is to test the validity of the first database connection with the DBMS.

9. The method of claim 7, further comprising:

in response to receiving the request to execute the particular statement, responding with a status indicating an error associated with the first database connection with the first database server at the DBMS.

10. The method of claim 1, further comprising:

receiving a notification of the planned operation of the first database server;

in response to receiving the notification, monitoring one or more connections with the DBMS to determine the safe point for the first database connection with the first database server.

11. The method of claim 1, wherein determining a safe point for the first database connection with the first database server includes, detecting one or more of: a) a request for a state of the first database connection, b) a request whether the first database connection is valid, c) a request whether the first database connection is usable, d) a request whether the first database connection is closed, e) a ping to the DBMS sent over the first database connection, or (f) a session whose state is determined to be recoverable and whose failover is expected to succeed.

12. The method of claim 1, wherein the planned operation is a planned maintenance operation or an operation for re-balancing session load for the DBMS.

13. The method of claim 1, further comprising identifying one or more database sessions to be released for the planned operation to commence.

14. One or more non-transitory computer-readable media storing a set of instructions, wherein the set of instructions include instructions, which when executed by one or more hardware processors, cause:

receiving a request for a planned operation for a first database server of a database management system (DBMS);

receiving, over a first database session over a first database connection with the first database server, one or more requests from a client system;

based on the one or more requests, determining a safe point for the first database session with the first database server at which the first database session of the client system with the first database server can be closed without affecting successful execution of one or more additional commands that the client system may request the DBMS to execute;

in response to the one or more requests, while the first database session has a valid status, providing to the client system a return status indicating an invalid status for the first database session over the first database connection with the first database server;

after returning the return status to the client system, causing the first database session, over the first database connection, with the DBMS to close.

15. The one or more non-transitory computer-readable media of claim 14, wherein the set of instructions further includes instructions, which when executed by said one or more hardware processors, cause, based on the one or more requests, determining a safe point for the first database session with the first database server by determining that the one or more requests include a request to test a validity of the first database connection with the first database server.

16. The one or more non-transitory computer-readable media of claim 14, wherein the set of instructions further includes instructions, which when executed by said one or more hardware processors, cause, based on the one or more requests, determining a safe point for the first database session with the first database server by determining that the one or more requests include a request boundary.

17. The one or more non-transitory computer-readable media of claim 14, wherein the set of instructions further includes instructions, which when executed by said one or more hardware processors, cause:

initiating the planned operation of the first database server of the DBMS;

sending to the client system a notification of the planned operation of the first database server;

wherein the notification indicates stopping of a service on the first database server or stopping of the first database server;

the notification causing monitoring for safe points to close one or more database sessions with the DBMS that include the first database session.

18. The one or more non-transitory computer-readable media of claim 14, wherein the set of instructions further includes instructions, which when executed by said one or more hardware processors, cause:

initiating the planned operation of the first database server of the DBMS;

migrating one or more services from the first database server to a second database server of the DBMS.

19. The one or more non-transitory computer-readable media of claim 14, wherein the set of instructions further includes instructions, which when executed by said one or more hardware processors, cause:

initiating the planned operation of the first database server of the DBMS;

migrating one or more services from the first database server to a second database server of the DBMS;

wherein the return status indicating the invalid status for the first database session causes the client system to request a different, a second database connection, to connect with the DBMS;

after initiating the planned operation of the first database server, receiving the request for the second database connection;

in response to receiving the request for the second database connection, establishing the second database connection with the second database server of the DBMS.

20. The one or more non-transitory computer-readable media of claim 14, wherein the set of instructions further includes instructions, which when executed by said one or more hardware processors, cause:

receiving, over the first database connection, a request to execute a particular statement on the first database server;

determining that the request to execute the particular statement is to test a validity of the first database connection of the client system with the first database server of the DBMS.

21. The one or more non-transitory computer-readable media of claim 20, wherein the set of instructions further includes instructions, which when executed by said one or more hardware processors, cause:

storing one or more connection test statements for testing a validity of one or more database connections with the DBMS;

receiving a request to enable testing the validity of one or more database connections with the DBMS using the one or more connection test statements;

in response to enabling testing the validity of one or more database connections with the DBMS using the one or more connection test statements, comparing the particular statement with the one or more connection test statements to determine whether the request to execute the particular statement is to test the validity of the first database connection with the DBMS.

22. The one or more non-transitory computer-readable media of claim 20, wherein the set of instructions further includes instructions, which when executed by said one or more hardware processors, cause:

in response to receiving the request to execute the particular statement, responding with a status indicating an error associated with the first database connection with the first database server at the DBMS.

23. The one or more non-transitory computer-readable media of claim 14, wherein the set of instructions further includes instructions, which when executed by said one or more hardware processors, cause:

receiving a notification of the planned operation of the first database server;

in response to receiving the notification, monitoring one or more connections with the DBMS to determine the safe point for the first database connection with the first database server.

24. The one or more non-transitory computer-readable media of claim 14, wherein the set of instructions further includes instructions, which when executed by said one or more hardware processors, cause, detecting one or more of: a) a request for a state of the first database connection, b) request whether the first database connection is valid, c) a request whether the first database connection is usable, d) a request whether the first database connection is closed, e) a ping to the DBMS sent over the first database connection, or (f) a session whose state is determined to be recoverable and whose failover is expected to succeed.

25. The one or more non-transitory computer-readable media of claim 14, wherein the planned operation is a planned maintenance operation or an operation for re-balancing session load for the DBMS.

26. The one or more non-transitory computer-readable media of claim 14, wherein the set of instructions further includes instructions, which when executed by said one or more hardware processors, cause identifying one or more database sessions to be released for the planned operation to commence.

* * * * *